Patented Apr. 25, 1939

2,155,531

UNITED STATES PATENT OFFICE 2,155,531

ARTIFICIAL CONSTRUCTION STONE

Frank L. Decker, Kimble, Pa.

No Drawing. Application July 28, 1937, Serial No. 156,233

5 Claims. (Cl. 106—31)

This invention relates to an improved composition adaptable for forming into construction blocks and the like, and more particularly to compositions of this character comprising shale.

Heretofore, compositions adaptable for molding purposes in the manufacture of brick and stone blocks for use in building construction have been formed of clay and similar agglomerates. These compositions have in general necessitated the presence near-by the place of manufacture of clay beds or the like in order that transportation cost be minimized and economical manufacture result.

It is an object of the present invention to provide a moldable composition adaptable for use in the manufacture of synthetic building stone which shall utilize shale or the like, thereby permitting exploitation of a material heretofore not employed for this purpose.

It is another object of the present invention to provide a composition which when molded can be provided with an ornamental facing coat adapted to simulate limestone, granite or marble or other ornamental stones normally used on building facings, the use of which is somewhat limited by cost.

It is a further object of the present invention to provide a composite building block of this character wherein the union between body material and facing material shall be substantially permanent in character and not readily effected in a deleterious manner by normal climatic changes.

It is another object of the present invention to provide a composition which can be readily and economically prepared from materials normally available during the course of building construction, thereby substantially diminishing transportation cost attendant upon the building operations.

Other advantages and features of the present invention will be apparent to those skilled in the art during the course of the following description.

Regarded in certain of its broader aspects, the present invention comprises a moldable composition prepared largely from shale with a small amount of resinified petroleum residue as binder. More specifically, the present invention comprises a molding composition consisting of shale, asphalt, melted rubber, and pigment or coloring material. The preferred proportion of ingredients is substantially as follows:

| | Per cent |
|---|---|
| Shale | 85 |
| Ordinary asphalt | 5 |
| Melted rubber | 5 |
| Mixed paint | 5 |

It is preferred that the moldable composition prepared in accordance with the present invention be made by mixing together shale or the like with asphalt and sufficient hot water to insure thorough moistening of the mass although it is preferred that the water content of the mixture shall be adjusted so that the mass remains a paste or does not become a fluid of substantially low viscosity. It is an essential feature of the present invention that the water used in the formulation of the molding composition be substantially hotter than room temperature in order to facilitate penetration of the shale and in order to accomplish certain other advantages which will be apparent to those skilled in the art, for example, in order to at least partially soften the bituminous binding material. When the shale or the like and the asphalt have been mixed to provide a homogeneous mass as heretofore described, the other ingredients including the melted rubber and the pigment are then incorporated in the whole mixture until the requisite degree of homogeneity is attained.

The composition so prepared can readily be molded and it is a notable feature of the blocks prepared from said composition that they can be handled very shortly after molding.

When it is desired to manufacture blocks for use in building facings or in other places where an ornamental facing is a consideration, it is preferred that the blocks be faced with a composition whereby certain ornamental stones such as marble, granite, limestone or the like are simulated. To accomplish this the blocks are surfaced with a mixture comprising pulverulent materials having the requisite physical appearance in the aggregate and binding material, for example, if it is desired to simulate marble, finely ground marble mixed with a binder such as paint or the like is coated upon the surface of the blocks. It has been found that attractive effects are obtained by using mixtures of paint and pulverized limestone, marble, light granite, red or blue shale or the like. In instances where it is desired to provide a scintillating or glistening surface composition, this is preferably produced by incorporating ground glass in the mixture.

Another embodiment of the present invention, suitable for use where blocks of high surface polish are desired, comprises preparing base blocks as heretofore described and incorporating lacquer or shellac in the surfacing mixture, for example, one part of lacquer or clear varnish mixed with approximately thirteen parts of stone and one part of mixed paint or the like can be used as surfacing composition. The finished product, after suitable polishing, will present a surface closely resembling that of natural granite.

A notable feature of the blocks prepared in accordance with the present invention is that they are durable and resistant to climatic changes.

It will be apparent to those skilled in the art that substitutions of substantial equivalents for the materials used in the hereinabove described specific embodiment of the present invention can be made without departing from the spirit thereof. These substitutions as well as other modifications are intended to be comprehended within the scope of the following claims.

What is claimed is:

1. The method of preparing a synthetic molding composition adaptable for the manufacture of artificial stone for building purposes comprising mixing shale and a bituminous binder with hot water whereby a paste of substantial consistency is obtained, incorporating in said paste melted rubber and pigment, and molding the same under pressure.

2. The method of preparing artificial building stone comprising mixing approximately 85%, by weight, of shale with approximately 5%, by weight, of bituminous binder in the presence of sufficient hot water to provide a plastic mass in a condition of insipient fluidity adding thereto approximately 5%, by weight, of melted rubber and approximately 5%, by weight, of pigment material and forming a homogeneous mixture of these materials into shapes adapted to building construction.

3. The method of preparing a synthetic molding composition adaptable for the manufacture of artificial stone for building purposes, comprising mixing a major proportion by weight of shale with a relatively minor proportion by weight of bituminous binder and melted rubber in the presence of sufficient hot water to provide a plastic mass in a condition of incipient fluidity and thereafter molding same under pressure.

4. The method of preparing artificial moldable composition adapted for use in the manufacture of synthetic building stone, which comprises the step of mixing shale, bituminous binder, melted rubber and water at an elevated temperature to form a substantially homogeneous plastic mass in a condition of incipient fluidity and thereafter molding same under pressure.

5. The method of preparing a synthetic molding composition adaptable for use in the manufacture of artificial stone for building purposes, comprising mixing a major proportion of shale and a minor proportion of binder material with hot water and pigment, whereby a plastic mass in a condition of incipient fluidity is produced, and thereafter molding same under pressure into shapes adapted to building construction.

FRANK L. DECKER.